(12) United States Patent
Forman et al.

(10) Patent No.: US 7,349,917 B2
(45) Date of Patent: Mar. 25, 2008

(54) HIERARCHICAL CATEGORIZATION METHOD AND SYSTEM WITH AUTOMATIC LOCAL SELECTION OF CLASSIFIERS

(75) Inventors: George Henry Forman, Port Orchard, WA (US); Henri Jacques Suermondt, Sunnyvale, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 845 days.

(21) Appl. No.: 10/262,742

(22) Filed: Oct. 1, 2002

(65) Prior Publication Data

US 2004/0064464 A1   Apr. 1, 2004

(51) Int. Cl.

| | | |
|---|---|---|
| G06F 7/00 | (2006.01) | |
| G06F 17/00 | (2006.01) | |
| G06F 15/18 | (2006.01) | |
| G06E 1/00 | (2006.01) | |
| G06E 3/00 | (2006.01) | |
| G06G 7/00 | (2006.01) | |
| G06N 5/02 | (2006.01) | |

(52) U.S. Cl. .......................... 707/102; 706/12; 706/14; 706/20; 706/47; 382/226
(58) Field of Classification Search ................ 707/102; 706/12, 14, 47, 20; 382/226
See application file for complete search history.

(56) References Cited

U.S. PATENT DOCUMENTS 6,092,059 A * 7/2000 Straforini et al. ............. 706/14
6,243,695 B1 * 6/2001 Assaleh et al. ............... 706/20
2003/0059106 A1 * 3/2003 Gutta ........................ 382/158

OTHER PUBLICATIONS

McCallum, Andrew et al., "Text Classification by Bootstrapping with Keywords, EM and Shrinkage," ACL '99 Workshop for Unsupervised Learning in Natural Language Processing, 1999, 7 pages.
Dumais, Susan et al., "Hierarchical Classification of Web Content," SIGIR 2000: Proceedings of the 23rd Annual International ACM SIGIR Conference on Research and Development in Information Retrieval, Jul. 2000, 8 pages.

* cited by examiner

Primary Examiner—Don Wong
Assistant Examiner—Cheryl M Shechtman

(57) ABSTRACT

The present invention relates generally to the classification of items into categories, and more generally, to the automatic selection of different classifiers at different places within a hierarchy of categories. An exemplary hierarchical categorization method uses a hybrid of different classification technologies, with training-data based machine-learning classifiers preferably being used in those portions of the hierarchy above a dynamically defined boundary in which adequate training data is available, and with a-priori classification rules not requiring any such training-data being used below that boundary, thereby providing a novel hybrid categorization technology that is capable of leveraging the strengths of its components. In particular, it enables the use of human-authored rules in those finely divided portions towards the bottom of the hierarchy involving relatively close decisions for which it is not practical to create in advance sufficient training data to ensure accurate classification by known machine-learning algorithms, while still facilitating eventual change-over within the hierarchy to machine learning algorithms as sufficient training data becomes available to ensure acceptable performance in a particular sub-portion of the hierarchy.

14 Claims, 4 Drawing Sheets

HIERARCHICAL CATEGORIZATION METHOD AND SYSTEM WITH AUTOMATIC LOCAL SELECTION OF CLASSIFIERS

BACKGROUND

Categorization is the problem of assigning items (e.g. documents, products, clients, etc.) into categories based on features of the items (e.g. which words appear in a document), and possibly subject to a degree of confidence. For example: vehicle X which has the features
  number of seats=55
  color=yellow
belongs to the category "school buses" with probability 95%.

The field's terminology has a number of common synonyms:
  categorization=classification, prediction
  features=attributes, properties
  (sub)categories=(sub)classes, (sub)topics
  confidence=degree of belief, certainty, probability
  items=cases, examples
  machine learning=induction.

Categorizers may be built manually by people authoring rules/heuristics, or else built automatically via machine learning, which induces a categorizer based on a large training dataset of items, where each item is labeled with its correct category assignment. Typically, the larger the training dataset, the better the classification accuracy, however, it usually costs something (human labeling effort) to gather the training set. In the earliest stages of collecting a training set, human-authored rules will typically have better accuracy than machine learning; however, as more training data becomes available, the accuracy of machine-learning algorithms improves (since they learn from that additional training data), and eventually may surpass what is practical with human-authored rules.

Examples of machine learning include the well-known naïve Bayes and C4.5 algorithms (or a so-called "stacked" combination of two or more such algorithms), and commercial offerings such as those of Autonomy Inc. and Moho Mine Inc. A major barrier to using machine-learning algorithms is that that they require a significant amount of training data in order to achieve optimal performance, which can be costly and/or labor intensive.

Examples of human-authored rule classifier systems include the topics search engine by Verity Corp., and email routing software by Kana Communications Inc. In principle, human-authored rule-based algorithms can be applied to classification problems where no training data are available, but may have high maintenance costs and sometimes inferior performance compared to machine learning approaches, because they do not learn to improve themselves and do not take advantage of available training data. Construction and maintenance of such human-authored rules requires substantial domain knowledge and is labor intensive. A particularly simple example of a rule-based classifier is a list of distinctive keywords for each class, with the first matching keyword in an item being used to classify that item. Alternatively, one may prefer the category for which the largest number of keywords match the document.

Hierarchical categorization involves a hierarchy of categories wherein at least some of the items to be categorized are to be assigned not only to certain categories, but also to certain subcategories within those categories. A well-known example of hierarchical categorization is the Dewey Decimal and Library of Congress subject headings used by many libraries to organize their book collections. By utilizing a hierarchical structure, a complex classification problem can be decomposed into a number of simple sub-problems. A top-down approach to hierarchical classification starts with a few classes which are further refined into a number of subclasses. Further details of known hierarchical classification methodology may be found in the article "Hierarchical Classification of Web Content" by Susan Dumais and Hao Chen, which was presented Jul. 24-28, 2000 in Athens, Greece and published in SIGIR 2000: Proceedings of the 23rd Annual International ACM SIGIR Conference on Research and Development in Information Retrieval and which is hereby incorporated by reference in its entirety. A plurality of categorization methods can be applied to categorization sub-problems in a top-down (also known as "Pachinko") approach, using a sub-classifier at each internal node to select which child branch to follow. The overall hierarchical categorization mechanism in effect combines the results of the local categorization methods on the sub-problems. The local categorization algorithms output their results through a standard interface, so that these various intermediate results can be combined by an overall categorization processor that does not need to know what the local categorization method is. The overall categorization processor takes an item, delegates it to one or more local categorization methods (possibly a series of these depending on the results of each), and combines the results of these. It can then report for the item and for zero or more classes whether the item belongs to the class, possibly including a degree of confidence (such as a probability). An optional extension is that it can report, for an item and for a class X with zero or more subclasses, whether the item belongs to the set consisting of the class X and all of the subclasses of X, again possibly subject to a degree of confidence such as a probability. Such a hierarchical structure can potentially be used to advantage in trainable classifiers, by using the larger volume and hence greater accuracy of statistical training data (in particular, relative frequency of particular words and phrases) at a parent node to smooth and extrapolate the more limited and less accurate such data available at a given child node.

A "bootstrap" methodology may sometimes be used to improve the performance of a simple keyword-based categorizer by using the simple categorizer's output as training data for machine learning. In the particular case of a hierarchical categorizer in which the nodes at the upper levels of the hierarchy will each process more training data than the nodes at the lower levels and thus will tend to make more reliable decisions, a statistical technique known as "shrinkage" may be used to refine the statistically less reliable results at a lower level by combining them with the more reliable probabilities associated with decisions at a higher level. Further details of a known hierarchical bootstrap methodology may be found in Text Classification by Bootstrapping with Keywords, EM and Shrinkage by Andrew McCallum and Kamal Nigam, which was presented in 1999 at the ACL '99 Workshop for Unsupervised Learning in Natural Language Processing, and which is hereby incorporated by reference in its entirety.

"Stacking" is a known technique for combining statistical results from multiple machine-learning algorithms to make a particular classification decision. In other machine-learning applications, the selection of an appropriate algorithm is based on a-priori knowledge of the data being categorized, or is determined experimentally using known training data.

BRIEF SUMMARY OF INVENTION

The present invention provides for automatic selection of different classifiers at different nodes within a hierarchy of categories. The local selection of classification methodology is preferably made dynamically at each local node of the hierarchy, and the selection decision at a descendant node is preferably at least partly dependent on a prior selection decision at a parent node, thereby making intelligent use of some of the factors that resulted in that prior decision without requiring substantial additional training and evaluation at all descendant nodes. For example, it may be possible to define a boundary (or "floor") separating an upper portion of the hierarchy having fewer nodes and thus more training data per node, from a lower portion of the hierarchy having more nodes and thus fewer training data per node. In one embodiment, such a floor is dynamically defined in terms of the training data available at each node, such that those nodes above the floor have access to sufficient training data to permit a particular trained classifier to provide adequate performance, while all nodes below the floor may be constrained to use other classification methodologies (for example, a less demanding type of trained classifier, or possibly even a flat a-priori rule-based classifier not requiring any training-data).

The invention is defined in the appended claims, some of which may be directed to some or all of the broader aspects of the invention set forth above, while other claims may be directed to specific novel and advantageous features and combinations of features that will be apparent from the Detailed Description that follows.

DETAILED DESCRIPTION OF EXEMPLARY EMBODIMENTS

Figure 1:
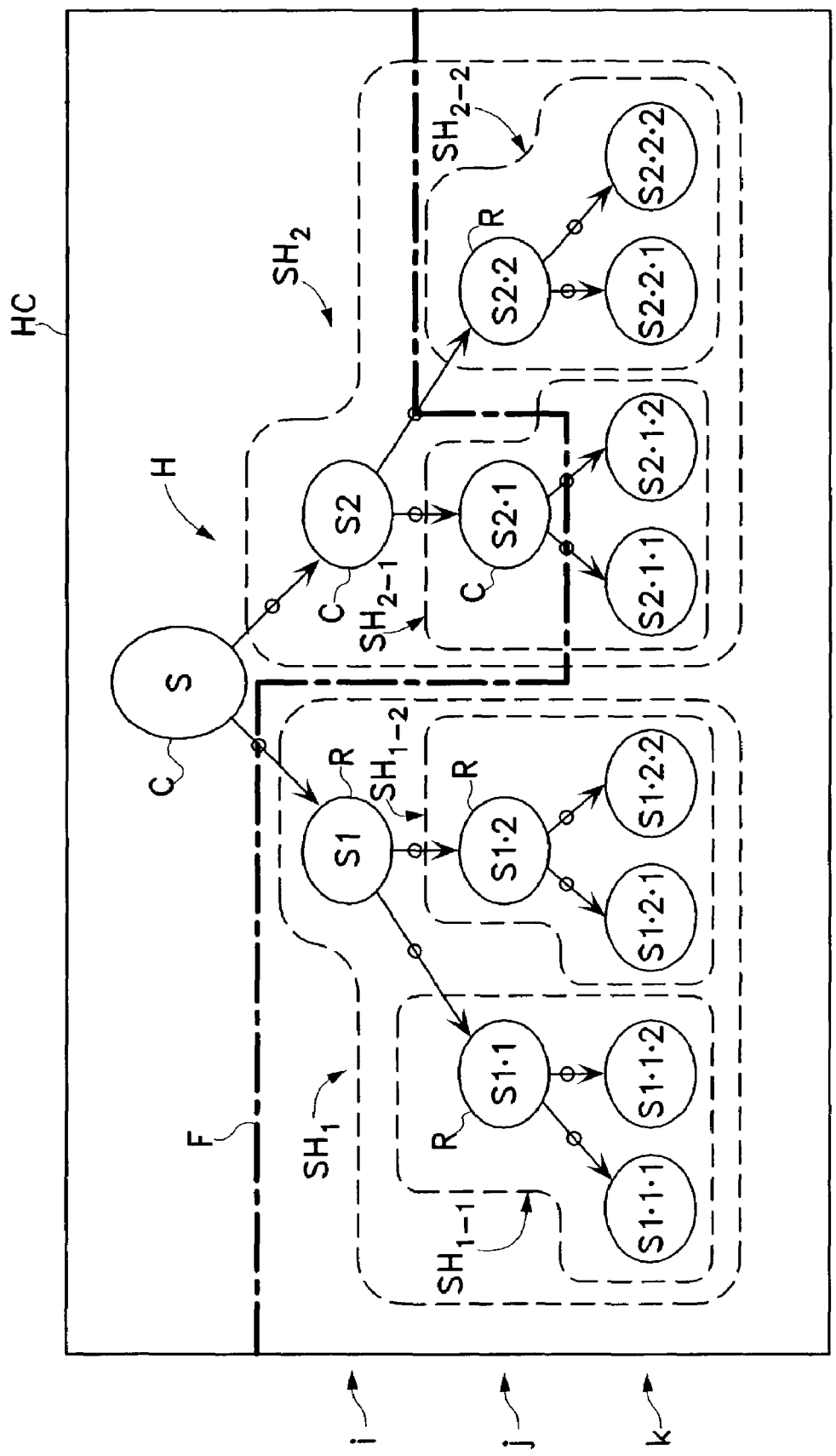
FIG. 1 shows an exemplary hierarchical categorization problem employing two different categorization methodologies in accordance with one embodiment of the present invention.

Reference should now be made to FIG. 1 of the attached Drawings, which represents an arbitrary hierarchical categorization problem H having 3 levels (i,j,k) of categories (labels) and a total of 8 subcategories (Si.j.k) at the third level, with each category at each of the upper levels branching in binary fashion into two subcategories at the next level.

Although as shown, each upper level node (S, Si, Si.j) has exactly two branches, and each of the eight bottom nodes Si.j.k is separated from the top node S by exactly two intermediate nodes (Si, Si.j), it should be understood that many of the principles of the present invention are equally applicable to more complex hierarchical structures, with more than three levels, with not all of the bottom nodes at the same level, and/or with more than two branches from one or more of the upper nodes. Using the previously mentioned example of books in a library, the two nodes in the first (i) level S1, S2 could represent fiction and nonfiction, the first two nodes in the second (j) level (S1.1, S1.2) could represent fiction for adult readers (S1.1) and fiction for children (S1.2) and the first two nodes in the third (k) level (S1.1.1, S1.1.2) could include adult romance novels (S1.1.1) and adult mystery novels (S1.1.2). Another example, from the computer sciences, might be a first level divided into hardware and software, the hardware being divided at a second level into systems and components, and the hardware systems being divided at a third level into hardwired and programmable. Those skilled in the art will realize that such a hierarchical arrangement H of the available categories is a natural byproduct of many human authored classification schemes and when available, often facilitates the construction of an appropriate human-rule based classifier.

Each branch from an upper node (S, Si, Si.j) of the exemplary Hierarchy H may define a subhierarchy (for example subhierarchies SH1 and SH2 depending from main node S), and, in recursive fashion, the upper node of each such subhierarchy (for example subhierarchies SH1 and SH2 may each define one or more lower level subhierarchies (for example sub-sub hierarchies SH1-1 and SH1-2). Except for the bottom nodes (Si.j.k), each node in the hierarchy H has an associated subclassifier (C,R) used for classifying data into the appropriate branch depending from that node, which collectively define a hierarchical classifier HC.

Figure 2:
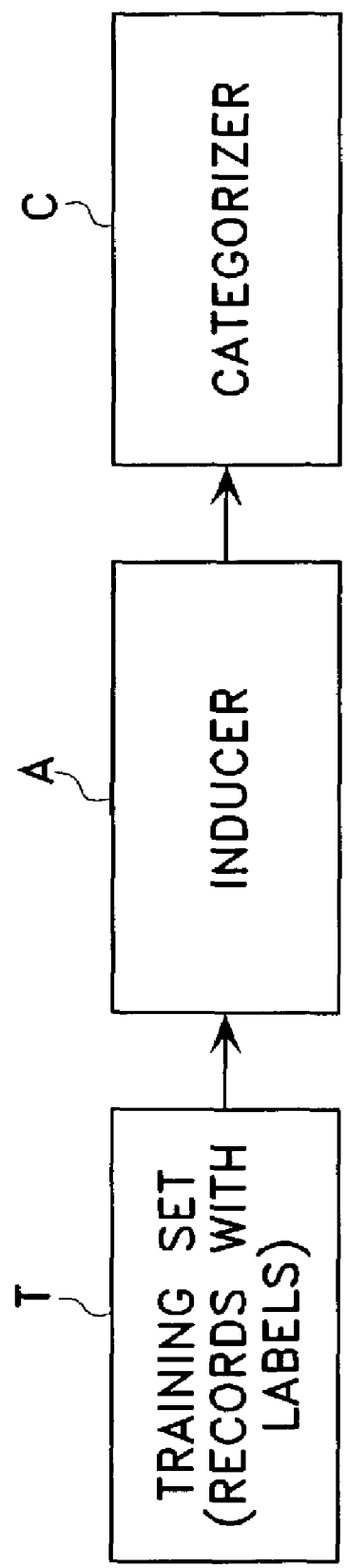
FIG. 2 depicts a typical relationship between a training set, an inducer, and a categorizer, such as may be used in some embodiments of the present invention.

The exemplary Hybrid Categorizer HC used in a given hierarchy H of categories (FIG. 1) is preferably derived dynamically from at least one rule-based classifier R and at least one induction (or machine learning)-based classifier A (See FIG. 2), with a training set T of labeled data being used to induce the learned classifiers C. Although for the sake of clarity the same symbol (R or C) is used for different subclassifiers at different levels of the hierarchy, those skilled in the art will realize that in practice each node of the classification hierarchy HC represents a different decision with different possible results, so that a particular subclassifier (C,R) at a particular node corresponds to a different subset of the various decisions encompassed within the particular classification methodology (C or R) applicable to the overall hierarchical classifier HC. Moreover, there need not be exactly two such methodologies for each node, nor must any such methodology necessarily be applicable to all nodes in the hierarchy. Indeed, there may be practical examples where some nodes have more than two candidate trained classifiers, while other nodes have no such candidate trained classifiers.

Figure 3:
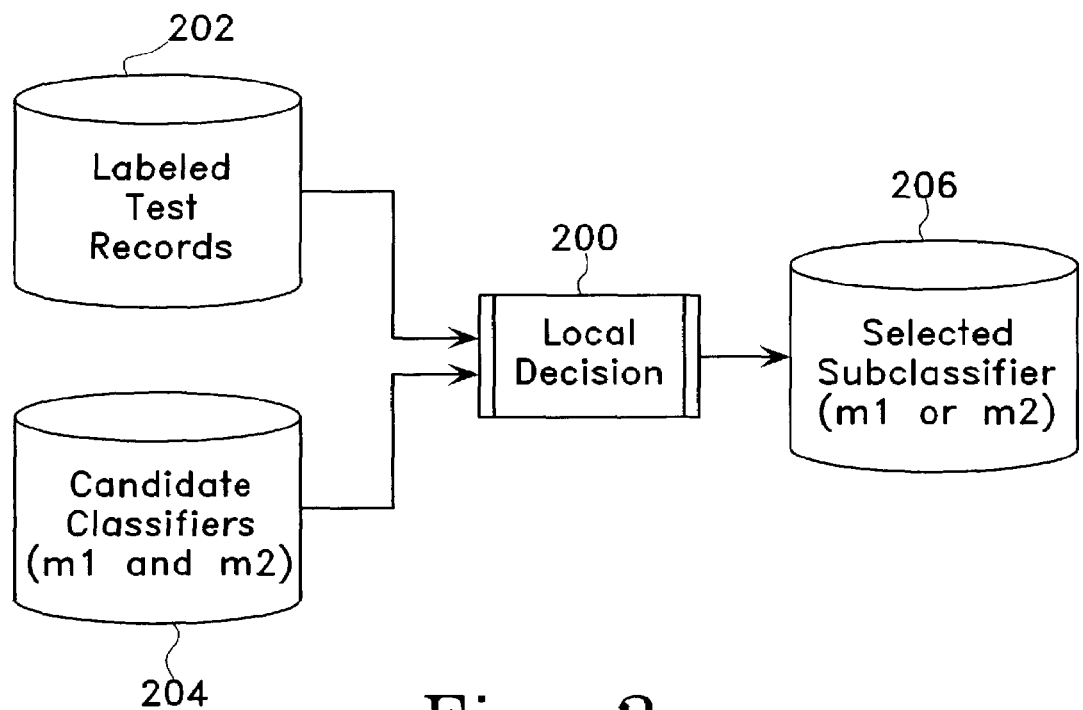
FIG. 3 depicts a system for performing local classification decisions in accordance with an exemplary embodiment of the present invention.
Figure 4:
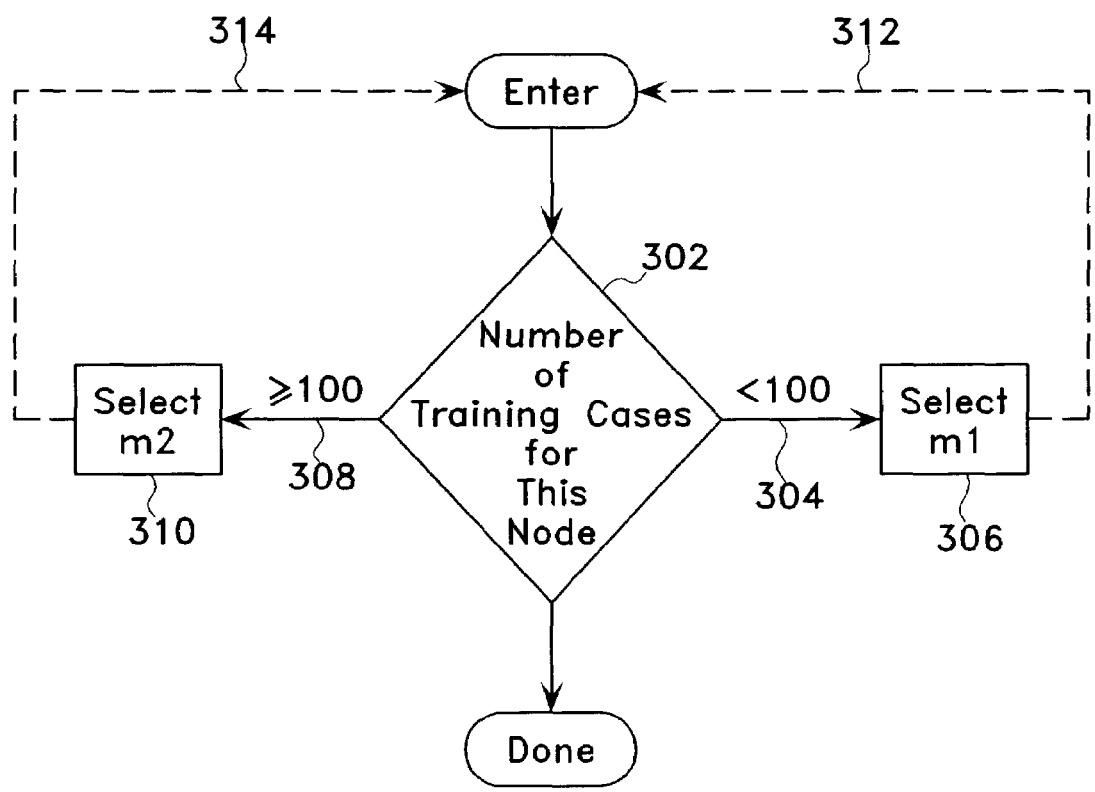
FIG. 4 depicts a local decision process such as may be used in one exemplary embodiment of the present invention.

FIG. 3 depicts an exemplary local decision mechanism 200 being used to select which subclassifier (categorization method) is best for a particular sub-problem (or, as shown in FIG. 1, for a particular decision node (S, Si, Si.j) of an associated hierarchical classifier HC). One embodiment of such a local decision mechanism 200 is an accuracy comparison in which a test set 202 of items (which could be the training set T of FIG. 2) for the sub-problem (labeled examples for which the "true" class is known) is used to test two available candidate sub-classifiers M1 and M2 204. The selection decision 206 can then be based on the relative accuracy of method M1 versus method M2 on that particular data. Another embodiment would be to use categorization speed—say method M1 can very rapidly classify on this sub-problem, and method M2 is very slow, then method M1 would be selected. Another exemplary embodiment (shown in FIG. 4) could simply be based on an absolute threshold on the number of training cases available. In that case, the local decision mechanism 200 could simply determine (block 302) whether there are fewer than 100 training examples at a particular node of any class (branch 304), in which case M1 would be selected (block 306) for that node, otherwise (branch 308) M2 would be selected (block 310). As indicated symbolically by the return loops 312, 314 (and as set forth in more detail in the exemplary local decision process set forth in the attached Appendix), a similar analysis and decision process may be repeated recursively for other nodes and other subtrees. As mentioned previously, the local decision mechanism is preferably based on one or more factors relevant to a particular local categorization algorithm and ultimate classification objective. Moreover, not only will the results vary from sub-problem to sub-problem, different decision mechanisms can be utilized at different places (nodes) in the hierarchy. The determination of which categorization method to apply to a particular sub-problem is ideally done dynamically (i.e. it is a function of changing data and/or objectives), and preferably can be subsequently refined with respect to one particular sub-problem without affecting other sub-problems.

A specific example of a local decision methodology in which one of the candidate classifiers is a learned classifier and the other is a non-learning, flat human-authored rule-based classifier will now be discussed with reference to the generic categorization hierarchy shown in FIG. 1 and FIG. 5 and the exemplary Pseudo-code set forth in the attached Appendix.

Figure 5:
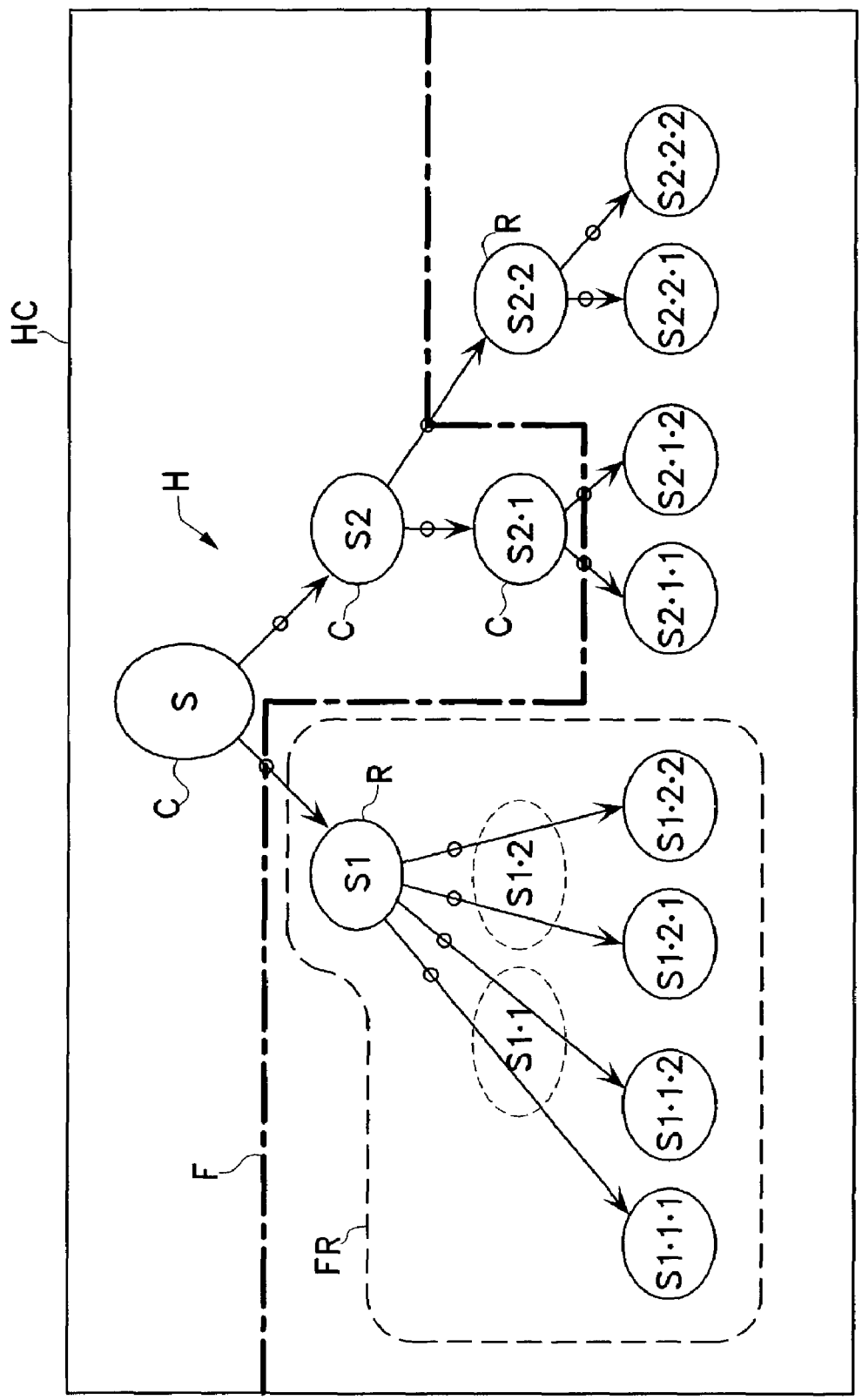
FIG. 5 shows a variant of FIG. 1 in which at least one of the selected classifiers is a flat classifier such as may be used in certain other embodiments of the present invention.

The inputs (lines 1-10) are as defined previously, and the output (lines 11-15) may be as shown in FIG. 5. Since the exemplary process is recursive (lines 40-47), it begins (line 16) with the whole hierarchy (exemplified with by the topmost node S in FIG. 1) and works its way down each of the subtrees of the hierarchy. The recursion down a particular subtree ends when (lines 17-19) only a single category is left (exemplified by reaching node S2.2.2), or (line 38) a flat classifier is chosen to cover the entire remaining subtree (illustrated by the use of flat classifier R to perform all classifications for the entire subtree FR in FIG. 5). At each step down the tree, a decision must be made to select which categorization technology should be used for the local decision problem. In the exemplary process illustrated here and in the Appendix, this decision is made by comparing (lines 34-36) the accuracy of a learned classifier C (generated by the machine learning algorithm A, lines 31-33) with the accuracy of a flat, rules-based classifier R. In other embodiments, other criteria may be used, e.g. speed, precision, recall, training effort, etc., or additional classifiers may be under consideration. To determine the accuracy of R, R is tested on the available training data T (lines 23-27) to determine the percentage of training items T that the rules R correctly classify into the correct subtree (i.e. if the rules classify an item to node Si.j.k, this is considered correct if the true label falls within the subtree Si), according to the labels on T. To determine the accuracy of the competing, machine learning technology A: All members of the available training set T are copied to training set T' with their labels adjusted to indicate only in which of the sub-trees $S_1$, $S_2$, $S_3$, . . . the item belongs, i.e. which branch to take from the current node S (lines 28-30). The training set T' is given as input to induction algorithm A (for example, naïve Bayes or C4.5), which outputs the trained classifier C (lines 31-32). The set T' is then used to estimate the accuracy of the classifier C (line 33), for example, using the known technique of cross-validation.

If the trained classifier C performs better than the flat rules classifier R at the current node (line 39), the trained classifier C is selected for use at the current node and the training, comparison and selection process is repeated recursively (lines 40-47) for each of the sub-hierarchies represented by each of that node's immediate descendants. In actual use (lines 50-54), the resulting classifier for the current sub-tree will use the learned classifier C (lines 50-51) to determine which of the sub-tree classifiers to use in the top-down Pachinko style (lines 52-53). Conversely (lines 34-36), if the performance of the trained classifier C is not acceptable (e.g., node S1 FIG. 5), the flat classifier R is selected without further recursion (line 38) for classifying items comprehensively in the entire sub-tree (at least until such time as more training data becomes available to improve the performance of the learned classifier).

In an alternate embodiment, the non-learning rules classifier R may be used in a top-down Pachinko manner instead of only being used for flat classification—i.e. the rules classifier R is a hierarchical classifier used to select the next branch to follow down the tree (as in R selecting the left subtree SH1-2 or right subtree SH1-2 of S1 in FIG. 1). In this embodiment, selecting the rules classifier R also entails recursion (the RETURN statement in line 38 is replaced with a copy of lines 40-54 with R substituting for C). If a particular node S* (for example, node S1.1) is a descendant of a node S (for example, node S1) for which the rule-based classifier R was selected because of insufficient training data for learning, it may be assumed that there is even less available relevant training data for S* than was available for the ancestor node S for which the rule-based classifier R was selected and therefore it is even less likely that a learned classifier can provide superior performance (lines 33-36). Thus, if a rule-based classifier R is selected for a given node (e.g., S1) because of insufficient training data for learning, R preferably will also be selected (line 38) for any descendant nodes (e.g., S1.1, S1.2) and no further accuracy comparisons in later recursions (lines 34-36) is warranted.

In the examples of both FIG. 1 and FIG. 5, a conceptual Floor F is defined below which a rule-based classifier R is appropriate, and above which a learned classifier C is appropriate. It is envisioned that in alternate embodiments, there may be a plurality of hierarchical classifiers and/or a plurality flat classifiers, some of them non-learning and some of them needing training. In general, the best of the available classifiers may preferably be used for each local classification problem above a dynamically defined Floor F, and one or more otherwise available subclassifiers are preferably eliminated below that Floor. In particular, if a flat classifier is selected for a given parent node (as shown in FIG. 5), then that selection will eliminate an otherwise available hierarchical subclassifier from being selected at its descendant nodes, and if a non-trained classifier is selected for a given parent node (as shown in FIG. 1), then that selection will eliminate an otherwise available trained subclassifier from being selected at its descendant nodes.

Consider a practical example: given a hierarchical categorization problem with a small but growing training dataset, a machine learning algorithm (e.g. Naïve Bayes), and a human-authored set of classification rules, the above described decision methodology will initially rely heavily on these human-authored rules, but as more training data becomes available in different portions of the hierarchy, the next time the local decision process is performed it will automatically switch to using the machine learning algorithm at those places in the hierarchy where it has enough training data to attain superior accuracy. The overall classifier follows a top-down (also known as "Pachinko") approach, using a sub-classifier at each internal node to select which child branch to follow-however, (as reflected in FIG. 5) at some nodes it may choose to use a sub-classifier that treats all remaining descendants as a single "flat" classification problem. When training a local Pachinko sub-classifier at any given node in the hierarchy, each child aggregates the training examples for all of its descendants— hence, higher nodes in the tree will tend to have more training data from which to learn an accurate machine learning classifier, and lower nodes without sufficient available training data may use other classifiers for example a less accurate trained classifier, or, as in the case of the above-described exemplary embodiment, human-authored rules. Moreover, in one preferred embodiment, the selection process may be simplified by providing a relatively simple, but not necessarily optimal, rule-based classifier that can be applied at all levels in the hierarchy as the default classifier, and by selecting that rule-based classifier not only at a node where there is not yet sufficient available training data for a trainable classifier (or the default classifier is otherwise clearly superior to all other candidates), but also at all other nodes descending from that node. This resultant boundary F separating a larger pool of available classifiers from a smaller pool of available classifiers can dynamically descend from parent to child as more training data is obtained. In effect, the selection of a certain type of classifier at a parent node (for example, a rule-based classifier R) eliminates the selection of an associated different type of classifier (for example, a trained classifier C) at a child node.

When more labeled training data becomes available, the entire selection process may be repeated, or preferably, limited to those portions of the hierarchy still using the rule-based classifier (R). By thus reducing and eventually altogether eliminating the categories subject to classification by the default rule-based classifier (which will typically be a human authored set of rules), the effort and cost of keeping it up to date may be reduced. The described exemplary hierarchical classifier provided thus is capable of providing full backwards compatibility with existing rule sets and requires only limited training data, but at the same time is capable of improved performance as additional training data become available. In particular, human-authored rules may be used in those finely divided portions towards the bottom of the hierarchy involving relatively close decisions for which it is not practical to create in advance sufficient training data to ensure accurate classification by known machine-learning algorithms, while still facilitating eventual change-over within the hierarchy to machine learning algorithms (C) as sufficient training data becomes available to ensure acceptable performance in a particular sub-portion of the hierarchy.

Moreover, although in one contemplated embodiment the selection process is performed (for ease of implementation) on the entire hierarchy using a set of labeled training data prior to the processing of any unlabeled data, the dynamic nature of the selection may be further exploited by incrementally reconsidering only those sub-branches (SH1, SH2.2) where sufficient training data to support a particular trained classifier has only recently become available, and not re-considering the decisions made above that point (Floor F) where sufficient training data was available to make an accurate evaluation of the available classifiers. Alternatively, one may use a "quick and dirty" learning algorithm for a while, and switch "on the fly" to a more sophisticated classifier built by a powerful but slow adaptive learning algorithm that runs in the background to eventually induce a more accurate classifier. Similarly, the choice of classifiers could be switched dynamically based on a user's change of goal, e.g. they originally wanted to see the most certain items for a category (precision), but now they are performing a keyword search against them and they would now prefer a classifier with greater coverage (recall).

In certain preferred embodiments, this dynamic selection of categorizers can even be done on the fly without having to take the system offline, thereby providing a dynamic "hot switching" of categorizers that ensures the optimal selection of categorization method at all times. For example, assume method M1 has been selected for a particular sub-problem based on a lack of training data, and gradually more training data have become available to the system, then as a threshold at a particular decision node is reached, method M2 can be applied to that sub-problem.

Trained classifiers and authored rule-based classifiers are two examples of different classification methodologies. However, the principles underlying the present invention are not limited to selection between those two methodologies. In particular, it may involve multiple types of trained classifiers, one of which works better in some places in the hierarchy and another (or others) in other places. The trained vs. authored distinction only serves as a very salient example of two methods that typically have different characteristics in terms of how they perform under various circumstances (i.e., the amount of training data available). What matters is not so much any theoretical difference in methodology, but rather the practical performance at a predetermined node or subtree of the hierarchy when a given classification methodology is used with the data that is then available. Thus the present invention is not limited to selection between trained and rule-based classifiers, but may also be applicable to selection of any two or more available classifiers. One example involving two trained classifiers, one hierarchical, the other flat, would evaluate the performance of a hierarchical implementation of NaïveBayes at a parent node that leads to other NaïveBayes subclassifiers at the child nodes versus a non-hierarchical implementation of NaïveBayes at that parent node that treats all descendant nodes as part of one big "flat" problem and assigns each of the records among all descendants. A similar example, but combining two rule sets developed by different human authors might make a local decision between a non-learned hierarchical classification with a non-learned flat classification R2. In either case, the selection of the flat classifier at the parent node would eliminate any subsequent selection of the hierarchical subclassifier at any descendant node. Moreover, a common "flat" classifier for all nodes below the dynamically defined boundary may not always be the optimal selection, nor will there necessarily be only two candidate methodologies at each node, with one methodology being selected above the a defined floor and the other methodology being selected below that floor.

The foregoing exemplary procedures are believed to be also applicable with slight modification to other trainable categorization processes employing multiple classification algorithms on the same sub-problem and combining the results using either a predetermined or learned criteria and/or weights, or to recursive statistical processes in which the classifier at a particular node uses computed probabilities from other nodes in the hierarchy. Similarly, those trained in the state of the art will be able to extend the foregoing exemplary procedures to classification hierarchies in which some items are assigned to more than one category, or cannot be assigned to any category.

Thus the disclosed hybrid classification methodology combines the advantages of different classification methodologies at different nodes of a hierarchical classifier. Moreover, since the particular classification methodology used at a particular sub-problem at a particular node of the hierarchy is preferably selected dynamically, it can provide for an easy transition from one classification methodology to another methodology, for example from a labor intensive human-authored rules categorizer to a data intensive machine learning trained categorizer.

Having described preferred embodiments of a novel hierarchical categorization method and system with automatic local selection of classifiers, (which are intended to be illustrative and not limiting), it is noted that modifications and variations can be made by persons skilled in the art in light of the above teachings. It is therefore to be understood that changes may be made in the particular embodiments of the invention disclosed which are within the scope and spirit of the invention as defined by the appended claims.

The invention claimed is:

1. A computer-implemented method for assigning computerized records into a predetermined hierarchy of predetermined categories, comprising the following steps:
   (a) providing a training set of computerized records having known feature vectors each labeled with an assigned one of said predetermined categories;
   (b) providing a second type of classifier usable at any node of the hierarchy;
   (c) using least a first subset of said training set to perform an inductive computerized procedure at a parent node of said hierarchy to thereby provide an associated candidate trained classifier at the parent node,
   (d) using at least a second subset of said training set to perform a computerized evaluation of the performance of the second type of classifier at the parent node relative to that of the associated candidate trained classifier;
   (e) if the computerized evaluation at the parent node favors the second type of classifier, assigning the second type of classifier to the parent node and for classifying cases into all nodes descending from the parent node, thereby defining a floor across said hierarchy below which said second type of classifier is utilized and above which only trained classifiers are utilized, and
   (f) otherwise, assigning the associated trained classifier to the parent node and repeating the steps of (c) through (f) for any descendant nodes immediately descending from the parent node to perform the computerized evaluations of the associated candidate trained classifier and the second type of classifier for use at a respective descendant node, and to assign either the associated candidate trained classifier or the second type of classifier as a subclassifier for use at the respective descendant node;
   (g) using either the associated candidate trained classifier or the second type of classifier that was assigned for use at the parent node in the step (e) or the step (f) to classify data into the appropriate branch in the parent node's subtree; and
   (h) using either the associated candidate trained classifier or the second type of classifier that was assigned for use as the subclassifier at the respective descendant node to classify data into an appropriate branch in the respective descendant node's subtree.

2. The method of claim 1 wherein selection of said second type of classifier for said parent node eliminates the possible selection of an associated candidate trained subclassifier at any descendant node in the parent node's subtree.

3. The method of claim 1, wherein said second type of classifier for said parent node is a rule-based classifier that uses a human-authored set of rules for assigning arbitrary feature vectors into respective predetermined categories.

4. The method of claim 3, wherein
   the associated candidate trained classifier at the parent node or at the respective descendant node is a machine-learning based classifier.

5. The method of claim 3, wherein selection of said human-authored classifier is based on an insufficient number of available training cases for that parent node in a predetermined validation set of records.

6. A computerized method for automatically assigning computerized records characterized by arbitrary feature vectors into a predetermined hierarchy of predetermined categories, comprising the steps:
   (a) providing a training set of computerized records having known feature vectors each labeled with an assigned one of said predetermined categories;
   (b) providing a human-authored rule-based classifier usable at any node of the hierarchy,
   (c) using at least a first subset of said training set to perform an inductive computerized procedure at a given node of said hierarchy to thereby provide an associated candidate trained classifier at that node,
   (d) using at least a second subset of said training set to perform a computerized evaluation of the performance of the rule-based classifier at said given node relative to that of the associated candidate trained classifier;
   (e) if the computerized evaluation at the given node favors the rule-based classifier, assigning the rule-base classifier to the given node and also assigning the rule based classifier to all nodes descending from the given node, thereby defining a floor across said hierarchy below which said rule-bused classifier is utilized and above which only trained classifiers are utilized, and
   (f) otherwise, assigning the associated trained classifier to the given node and repeating steps (c) through (f) for at least two child nodes immediately descending from said given node.

7. The computerized method of claim 6, further comprising the steps
   (g) providing a supplemental training set of labeled records including at least some additional records for at least one untrained node below said floor, and
   (h) using said supplemental training set, repeating said steps (c) through (f) for said at least one untrained node.

8. The computerized method of claim 6, wherein said computerized evaluation is based at least in part on cross validation of estimated accuracy.

9. The computerized method of claim 6, wherein the computerized evaluation is based at least in part as to whether sufficient training data is available at the given node for the, candidate trained classifier.

10. A system for selecting classifiers used at individual nodes of a hierarchical classifier, comprising:
    at least two candidate classifiers;
    a data store containing labeled records; and
    a processor for using at least some of said labeled records to induce a trained classifier from a first candidate classifier and to select between said trained classifier and a predetermined second candidate classifier for use at a parent node of the hierarchy, wherein the processor selects either the trained classifier or the predetermined second candidate classifier for use at the parent node by
    (a) using at least a first subset of a training set comprised of computerized records having known feature vectors each labeled with an assigned one of predetermined categories to induce the trained classifier;

(b) using at least a second subset of said training set to perform a computerized evaluation of the performance of the predetermined second candidate classifier relative to that of the trained classifier;

(c) if the computerized evaluation favors the predetermined second candidate classifier, assigning the predetermined second candidate classifier to the parent node and also assigning the predetermined second candidate classifier to all nodes descending from the parent node, thereby defining a floor across said hierarchy below which said second type of classifier is utilized and above which only trained classifiers are utilized, and (d) otherwise, assigning the trained classifier to the parent node, and repeating the steps of (a) through (d) for a child node immediately descending from the parent node to select either the trained classifier or the predetermined second candidate classifier as a subclassifier for use at the child node; and the processor uses a selected classifier comprised of the trained classifier or the predetermined second candidate classifier for use at the parent node to classify data into the appropriate branch in the parent node's subtree, and uses a selected subclassifier comprised of the trained classifier or the predetermined second candidate classifier for use at the child node to classify data at the child node.

11. The system of claim 10, wherein selection of said predetermined second classifier eliminates the possible selection of a trained classifier at any child node in the parent node's subtree.

12. The system of claim 10, wherein said predetermined second classifier is a rule-based classifier that uses a predetermined set or rules for assigning arbitrary features vectors into respective predetermined categories.

13. The system of claim 10, wherein
the trained classifier for use at the parent node and the trained classifier for use at the child node are machine-learning based trained classifiers.

14. The system of claim 10, wherein selection of said predetermined second candidate classifier is based on an insufficient number of available training cases in the training set.

* * * * *

UNITED STATES PATENT AND TRADEMARK OFFICE
CERTIFICATE OF CORRECTION

PATENT NO. : 7,349,917 B2  Page 1 of 1
APPLICATION NO. : 10/262742
DATED : March 25, 2008
INVENTOR(S) : George Henry Forman et al.

It is certified that error appears in the above-identified patent and that said Letters Patent is hereby corrected as shown below:

In column 9, line 27, in Claim 1, after "using" insert -- at --.

In column 10, line 35, in Claim 6, delete "rule-bused" and insert -- rule-based --, therefor.

In column 12, line 13, in Claim 12, delete "or" and insert -- of --, therefor.

In column 12, line 13, in Claim 12, delete "features" and insert -- feature --, therefor.

In column 12, line 17, in Claim 13, after "are" insert -- a --.

Signed and Sealed this

Eighth Day of July, 2008

JON W. DUDAS
*Director of the United States Patent and Trademark Office*